Oct. 19, 1965 R. C. LORING 3,213,411
METHOD OF OBTAINING REVERSE PATH TIME TIE
BETWEEN SEISMIC SIGNALS
Filed Jan. 12, 1962 6 Sheets-Sheet 1

INVENTOR.
R. C. LORING
BY *Young & Quigg*
ATTORNEYS

Oct. 19, 1965  R. C. LORING  3,213,411
METHOD OF OBTAINING REVERSE PATH TIME TIE
BETWEEN SEISMIC SIGNALS
Filed Jan. 12, 1962  6 Sheets-Sheet 6

INVENTOR.
R. C. LORING
BY Young & Quigg
ATTORNEYS

United States Patent Office 3,213,411
Patented Oct. 19, 1965

3,213,411
METHOD OF OBTAINING REVERSE PATH TIME TIE BETWEEN SEISMIC SIGNALS
Ralph C. Loring, Bartlesville, Okla., assignor to Phillips Petroleum Company, a corporation of Delaware
Filed Jan. 12, 1962, Ser. No. 165,848
6 Claims. (Cl. 340—15.5)

This invention relates to a method and apparatus for utilization in the identification of information in a plurality of signals. In one aspect the invention relates to reflection seismology, whereby seismograph records are produced and geophysical data interpreted therefrom. In another aspect the invention relates to the identification of information contained in low signal-to-noise ratio signals. In yet another aspect the invention relates to method and apparatus for improving the signal-to-noise ratio of seismic signals. In yet another aspect the invention relates to obtaining the reverse path time tie between seismic records.

The detection of systematic reflection events on seismograph records by visual means is often extremely difficult, if not impossible, when the energy in the systematic reflection events is of the same order of or less than that in the unsystematic events appearing on the same recordings. As a practical matter visual identification of common reflections in a plurality of records generally cannot be made unless the signal-to-noise ratio is greater than approximately 1.5. Unfortunately, records of this quality cannot always be obtained in many areas.

Many methods have been proposed and developed to improve the seismic record to enable the operator to detect reflection arrivals. One of the presently preferred methods is that of coherence multiplication, a process that can be viewed as a continuously optimum filtering of the seismic record. This process requires summing of all the traces and multiplying each trace by this sum. The multiplication is carried out only for those intervals of time when the sum trace and the individual trace are of the same polarity. The process yields a record with the same number of traces as before but with a higher signal-to-noise ratio. On the average, the improvement in signal quality of the seismograph is proportional to the square root of the number of traces in the composite.

However, the achievement of this improvement is critically dependent upon the time alignment of the signals; for only when the signal component is aligned is the trace a measure of the quantity desired. This time alignment consideration cannot be overlooked in any mixing process.

The times of arrival of the elastic waves from the shotpoint to the different seismometers vary with the horizontal or surface distance between the shotpoint and seismometers. This variation or difference in time across the seismogram is referred to as normal moveout (sometimes as angularity of path) and is a dynamic error which tends to obscure alignments of corresponding signal portions along traces. The normal moveout times varies nonlinearly in magnitude during the recording of these seismic signals. The magnitude is laregst right after the detonation of the shot, when the differences in distances of the elastic wave travel paths are largest. The magnitude decreases as the differences in travel paths decrease for successively deeper reflecting horizons. The exact manner in which the normal moveout time varies as a function of time after the initial seismic disturbances will, of course, depend on the spacing of the different seismometers and the particular velocity function of the surveyed area.

A second time alignment correction which must be made is due to topographic effects such as variations in the elevation of the shotpoint and seismometers and the existence of a weathered layer at the earth's surface. These effects introduce constant static errors in the time alignment of seismic events on the seismogram traces.

However, the requirement of accurate time alignment of low signal-to-noise ratio seismic signals for use in the coherence multiplication process again leads to the difficulties of searching the record for reflection events where the events are not visually evident.

In accordance with one aspect of copending application Serial No. 155,113, filed on November 27, 1961, by J. P. Lindsey, S. E. Elliott and R. C. Loring, assigned to the assignee of the present application, there is disclosed a process and apparatus for improving the reflection seismology technique by increasing the readability of low signal-to-noise ratio seismic signals by effecting the proper time alignment of the low signal-to-noise ratio signals through the process of time aligning the signals at various dip angles by means of an electromechanical analog of the time triangle, summing the time aligned signals for each dip angle to form composite signals, comparing the individual time aligned signals with the respective composite signal to form output signals, summing the output signals to obtain correlation signals representative of the degree of correlation between the individual signals and the composite signal, and comparing the correlation signals to determine the appropriate dip angle, and then increasing the signal-to-noise ratio of the individual seismic traces which have been time aligned with the proper dip angle by summing all of such traces and multiplying each trace by the sum during the intervals of time when the sum and the individual trace are of the same polarity.

However, when the time alignment of seismic signals is altered, such as by the application of angularity and/or dip corrections, the "reverse path time tie" data is obliterated and this means of correlating the data from two different shotpoints is lost.

In accordance with one aspect of the present invention there is provided a procedure and means for obtaining the "reverse path time tie" between data from different shotpoints even though the time alignment of the original data has been altered. This is accomplished by providing at least one time trace corresponding to each set of data, applying the same manipulation to the time trace as to the respective data, and then comparing the altered time traces of the different sets of data to locate the "reverse path time tie."

Accordingly, it is an object of the invention to improve the reflection seismology technique by increasing the readability of seismographic records. Another object of the invention is to correct seismographic records by an improved technique which is rapid, accurate, and relatively simple. Another object of the invention is to provide improved method and apparatus for obtaining the reverse path time tie of seismic records.

Other aspects, objects and advantages of the invention will be apparent from a study of the disclosure, the drawings and the appended claims.

In the drawings FIGURE 1 is a block diagram of a coherence multiplication process;
FIGURE 2 is a representation of low signal-to-noise ratio signals to be processed;
FIGURE 3 is a representation of signals obtained by the application of a coherence multiplication procedure to the signals of FIGURE 2;
FIGURE 4 is a schematic view of a multi-channel mechanical analog corrector;
FIGURE 5 is a block diagram of one embodiment of the discrimination apparatus;

Figure 1:
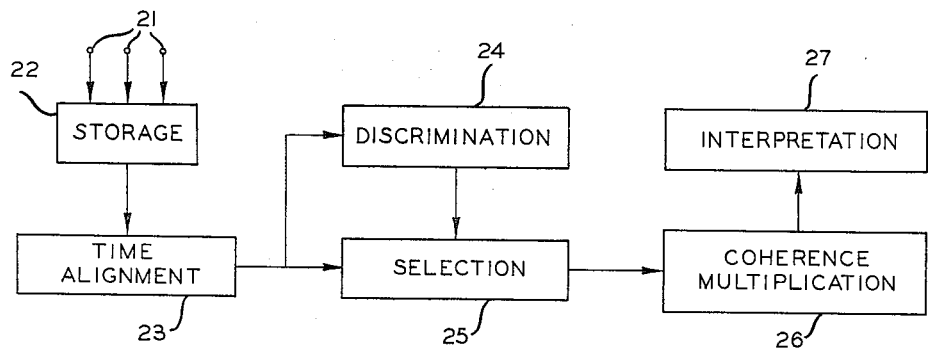
Figure 2:
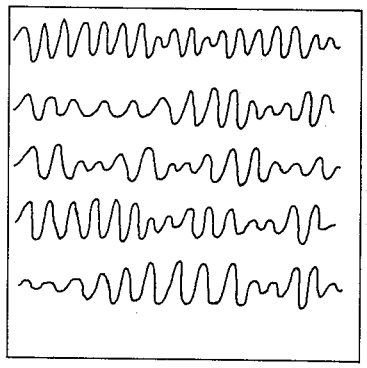
Figure 3:
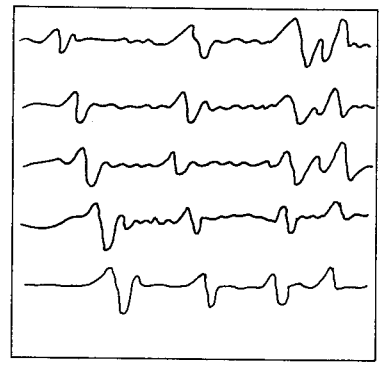
Figure 4:
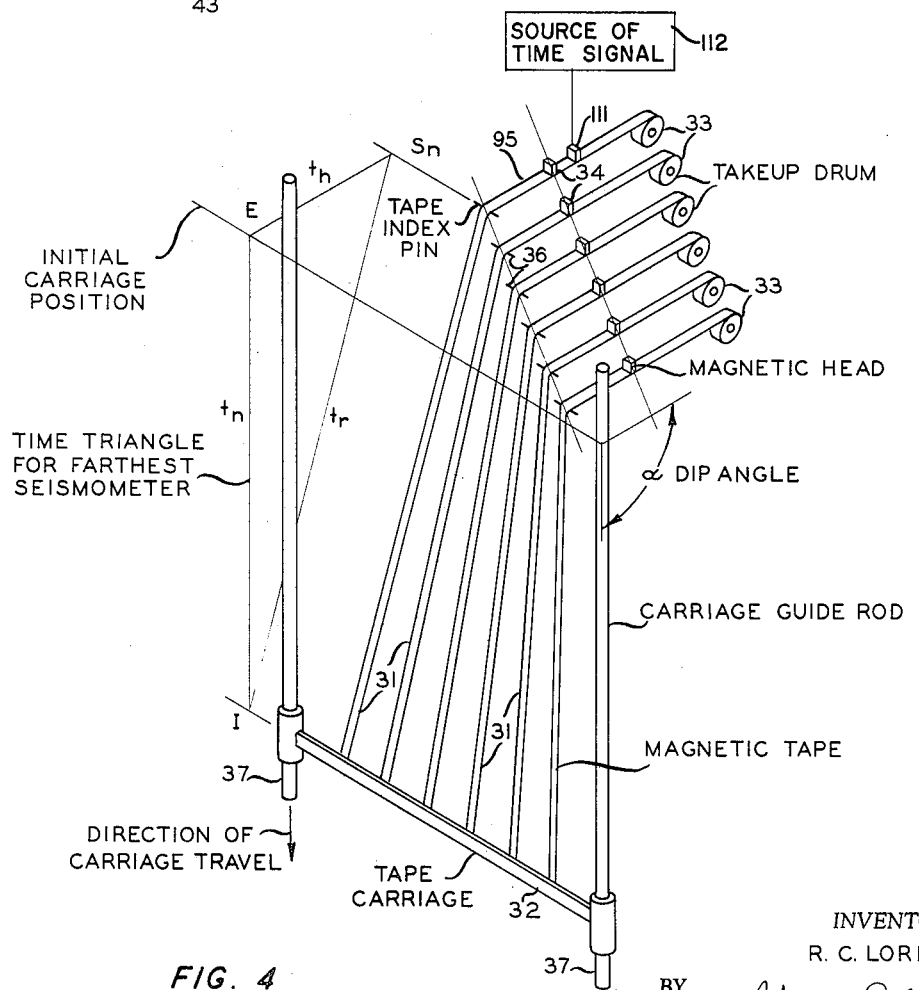

Referring now to a broad view of the overall process as shown in FIGURE 1, the outputs from a plurality, commonly 24, of seismic detectors 21 are fed into storage zone 22, which can be a magnetic tape storage device. These outputs can be low signal-to-noise ratio seismic signals, such as illustrated in FIGURE 2. When it is desired to process the seismic signals, they are removed from storage zone 22 and introduced into time alignment zone 23 wherein the signals are time aligned at various dip angles. The time aligned signals corresponding to each dip angle are passed to discrimination zone 24 to produce a coherence signal for each dip angle. The coherence signals are compared to select the proper dip angle in selection zone 25. The time aligned seismic signals corresponding to the proper dip angle are then passed to coherence multiplication zone 26 wherein the signal-to-noise ratio is improved. The improved signals are then transmitted to interpretation zone 27 for the interpretation of the seismic record. The improved signals corresponding to the data of FIGURE 2 are illustrated in FIGURE 3. FIGURE 4 is a schematic view of a multi-channel mechanical analog time alignment corrector in accordance with a preferred embodiment. The triangle $EIS_n$ is representative of the space relationship between shotpoint E, seismometer station $S_n$, and image point I. Image point I is the apparent origin of the reflected sound waves detected by the seismometer, and lies as far below the particular reflecting horizon as the shotpoint E is above the horizon and is located along a line normal to the reflecting horizon and intersecting the shotpoint. Since the dimensions of the space triangle are distance, division of each of the triangle legs by a velocity parameter converts the triangle dimension to time. The average velocity $v$ of the seismic ray path can be utilized. This conversion to time units produces the time triangle having sides $t_h$, $t_r$, and $t_n$, where $t_h$ is the horizontal time from shotpoint E to seismometer station $S_n$, $t_r$ is the time from shotpoint E to reflector to seismometer $S_n$ (or from image point I to seismometer $S_n$), and $t_n$ is the normal time from shotpoint E to reflector and back to shotpoint.

A plurality of magnetic tapes 31, each containing the trace from a respective one of a plurality of seismometers, $S_n$ are attached at their initial time end to a tape carriage 32 which is adapted to move at a constant speed in one direction along guide rods 37. The other end of the tapes 31 are attached to a tape takeup drum 33. Since the tapes 31 have a dimension in time units, they can represent the leg $t_r$ of the respective time triangle. As the tape carriage 32 starts at the indicated initial position and travels uniformly downward, the tapes will move across the magnetic playback heads 34 allowing the seismic data to be reproduced. The resulting non-uniform tape velocity across the playback heads 34 will cause the time of playout of reflection events to be equivalent to normal time $t_n$ rather than reflection time $t_r$ since the location of the playback heads 34 and tape 31 are such that reproduced events are advanced by an amount equal to $\Delta t$, which is $t_r - t_n$. Consequently, the normal moveout time correction $\Delta t$ is accomplished directly in playback operation.

When the reflecting horizon is tilted or dipped, an appropriate change in the time triangle can be made to maintain the mechanical analog. This can be accomplished by changing the angle between the $t_h$ and $t_n$ legs of the triangle from 90°. The amount of change is equal to the dip angle $\alpha$.

The corners of the six time triangles represented by the tape index pins 36 are the only corners that are not common. However, these corners are related positionally in the same way that the seismometer stations are related. So, if the index pins 36 are coupled in such a way that movement of the pin for the farthest seismometer station also moves the other pins in proportion, all the $t_h$ dimensions of each triangle are maintained in the proper proportion, and thus all of the six time triangles are generated simultaneously with a downward motion of the tape carriage 32.

There are two basic phases of operation of the multichannel device such as schematically illustrated in FIGURE 4. First, the seismic field data is reproduced in such a manner that each trace of the seismogram is transcribed onto an individual magnetic tape of the analog corrector. Then, the data on the individual magnetic tape are played off in such a way that the required time corrections are accomplished. To transcribe the field data onto the individual magnetic tapes of the analog device, all of the index pins 36 (which are attached to magnetic heads 34) are positioned at the initial carriage position. This means that the $t_h$ arm is positioned so that the $t_h$ dimension is zero. In this condition, the tape carriage is started and moves uniformly downward as each channel of seismic data is recorded on its respective tape. No change in the time alignment of reflection events is produced by the recording of the tapes in this phase.

To play back the data thus recorded on the individual magnetic tapes, the tape carriage 32 is returned to its initial starting position and the $t_h$ arm is swung out to a position corresponding to the $t_h$ value desired at time zero. As the tape carriage 32 is started and moved uniformly downward, the $t_h$ arm is moved in such a way that the proper value of $t_h$ is maintained at all times for all channels. When the playout made in this phase is examined, all reflection events will be time-aligned if the proper $t_h$ occurred at the reflection normal time $t_h$. It is also necessary that the plane containing the $t_n$ dimensions be set at the correct angle. If the reflections are from a subsurface horizon that has zero dip, the $t_h$ plane must be at exactly 90° with respect to the plane of travel of the tape carriage. For other than zero dip angle of the reflecting bed, the $t_h$ plane must be accordingly tilted and then the data played out to achieve the time alignment of the reflection events.

The details of a preferred embodiment of the tape analog corrector are disclosed in copending application Serial No. 123,231, filed July 11, 1961, by G. R. Piety and R. A. Doubt, assigned to the assignee of the present application, the description of which is incorporated herein by reference.

Figure 5:
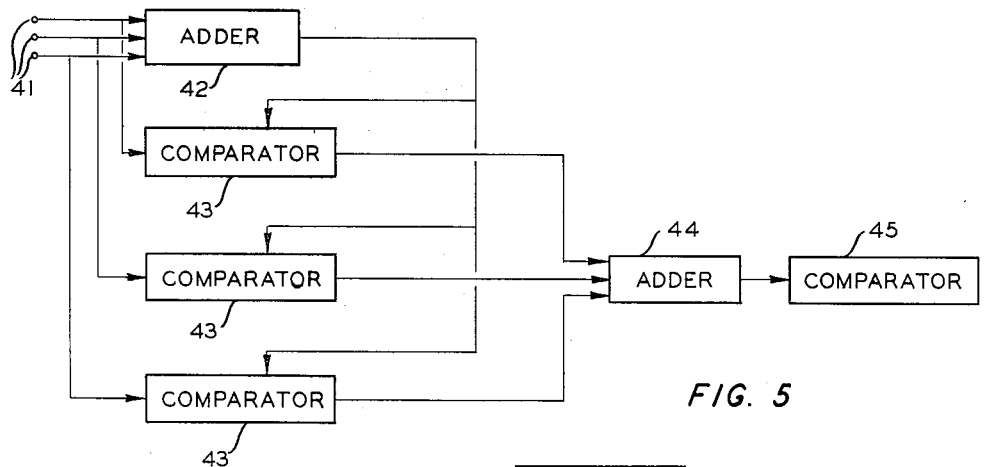

Referring now to FIGURE 5, there is shown a block diagram of the discrimination apparatus wherein the transcribed signals obtained from magnetic transcribers 34 are applied to respective input terminals 41 of summing means 42. A plurality of comparing means 43 are provided, one for each transcribed signal. The transcribed signals are summed in summing means 42, and the sum is compared against each individual transcribed signal in respective comparing means 43, each of which produces an output signal when the respective transcribed signal is in phase with the sum. The output signals are transmitted to summing means 44, the output of which is transmitted to comparison means 45. The magnitude of the output of summing means 44 is a coherence signal which is representative of the common information in the transcribed signals. The procedure is then repeated for a plurality of values of dip angle in the tape analog corrector. The output signals of summing means 44 corresponding to each value of dip angle are stored in comparing means 45 and then compared with each other to determine the proper dip angle for the particular set of seismic data.

The details of a preferred embodiment of the discriminator are disclosed in copending application Serial No. 130,919, filed August 11, 1961, by J. P. Lindsey, assigned to the assignee of the present application, the description of which is incorporated herein by reference.

Figure 6:
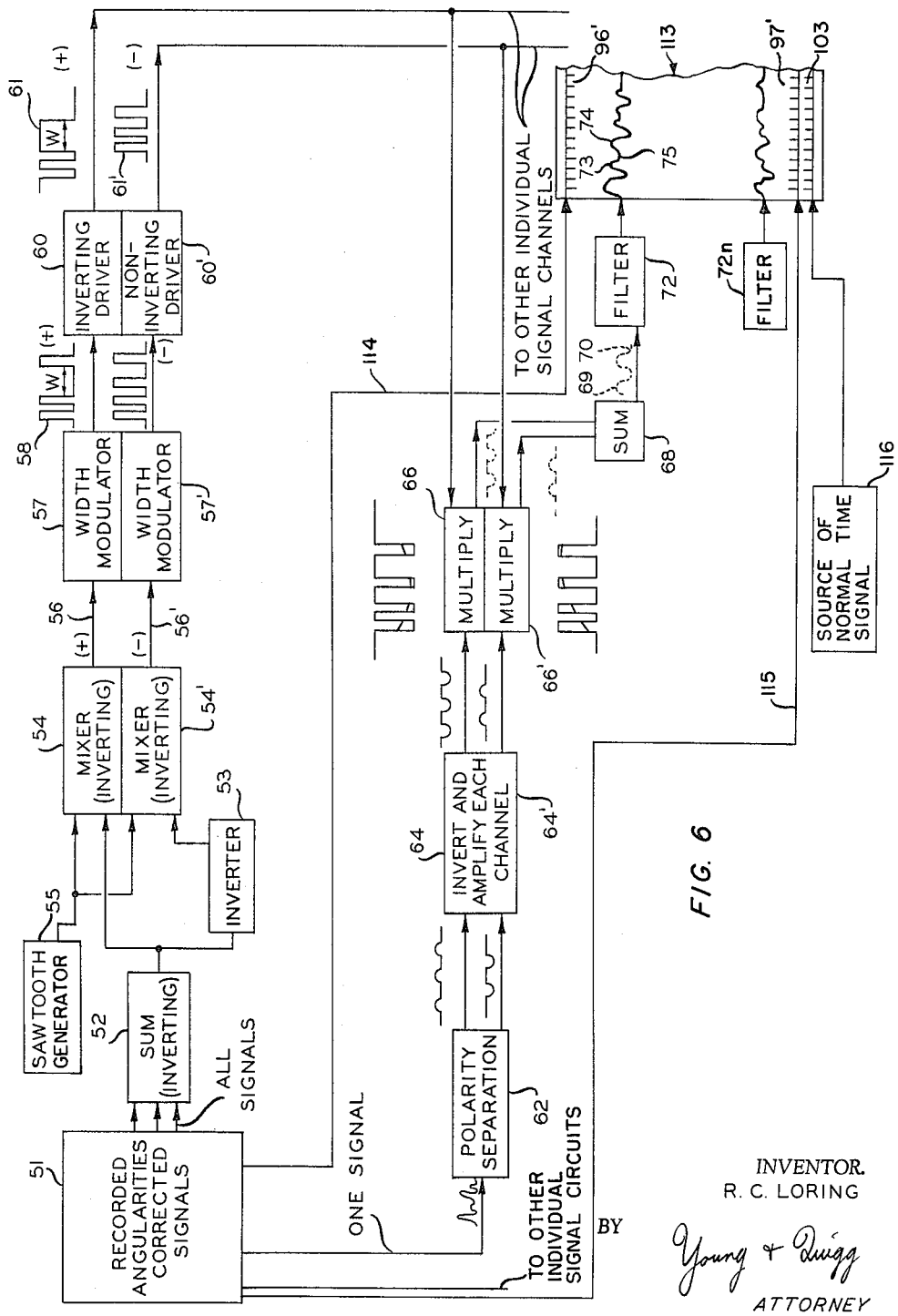
FIGURE 6 is a schematic representation of the coherence multiplication apparatus and process.

Referring now to FIGURE 6, there is shown a storage means 51 wherein there is disposed a plurality of individual seismic signals which have been corrected for angularities-of-path in time alignment zone 23 (see FIGURE 1) in accordance with the proper dip angle as determined in discrimination zone 24 and selection zone 25. Storage means 51 can comprise a magnetic tape. All of the corrected signals are removed from storage means 51 and applied to a means for summing 52 to thereby form the control trace.

The control trace that appears at the output of 52 is next applied to each of two channels in such manner that the control trace is divided into (+) and (−) polarity components. Where reference is made hereinafter to a plus or minus polarity signal that is derived from this seismic data, the reference is to the polarity of the signal as it appears when drawn from the storage means 51, regardless of its actual polarity in subsequent apparatus and operation. This is because the means for summing 52 and other apparatus each causes a phase inversion. Therefore, for clarity, a plus (+) signal or channel (a channel for operating on a plus signal) refers to a signal as it appears in the storage means 51, and similarly for the opposite polarity. The ultimate output signal of the coherence multiplication system is phase inverted from the input signal of the coherence multiplication system. It is not essential to correct this condition, but correction can be achieved by connecting an inverting amplifier to the output terminals. The polarity of the components of the control trace is determined in accordance with an arbitrarily selected zero. The same operations are performed on this control trace in each channel. Therefore, for the sake of brevity, only one channel—that operating on the positive polarity signal—will be described hereinafter. The negative polarity signals are operated on in that portion of the apparatus denoted by prime numbers. For the sake of providing uniform channel construction, the signal into the (−) channel is subjected to phase inversion in 53.

The control trace is next applied as one of the input signals to a mixer 54, which is really another means for summing and which also receives a negative-going second input (sawtooth) signal from sawtooth generator 55 and produces an output signal 56 which is the sum of the sawtooth signal and the input signal from summing means 52. A negative-going sawtooth from sawtooth generator 55 is applied to both the plus and minus polarity channels because (a) mixers 54 and 54′ include a phase-inverting amplifier and (b) inverter 53 provides a control trace of correct phase for mixing with the sawtooth in the negative channel.

The output signals 56 thus produced are next applied to first and second width modulators 57 and 57′ wherein there is formed a time series of pulses, the spacings of which are a function of, and loosely speaking may be said to be representative of, the successively occurring amplitudes of the respective polarity component of the control trace. The width modulator 57 (also 57′) is essentially a flip-flop which is adjusted to change state upon the application to the input terminal thereof of a predetermined voltage E and to subsequently change state after that event only upon the input signal going to zero. Changes in the region from zero to E volts produce no change of state. The switching function upon the application of voltage E occurs whether the voltage is equal or greater than E.

The output signal of the width modulator 57 has the waveform 58, and is applied to a driver 60. One of the principal reasons for supplying the drivers 60 and 60′ is to provide sufficient power so that the wave trains 61 and 61′, respectively, formed therein can be applied to a plurality of individual channels, thereby to be compared, i.e., multiplied by the individual seismic traces operated on in each individual channel. Moreover, it is to be noted that the output signals 61, 61′ from the driver (and width modulator too) have various spacings W, each of which are representative of an amplitude of the control trace produced in the means for summing 52. The reason that two channels are provided for producing these time spaced pulses is so that signals of different polarities can be multiplied by them.

This common equipment of the coherence multiplication system provides a control trace which is compared by multiplication with each individual seismic data trace in an individual subsequent circuit. One of these subsequent circuits is next described. It is understood that a plurality of these individual circuits is provided and that, preferably they are all constructed in like manner.

Still referring to FIGURE 6, a signal representing a lower quality seismic data trace is removed from storage 51 and applied to a means, 62, for separating such trace into its positive and negative polarity components. From this point on there is a separate channel provided for the components of each polarity. These components are next applied to an inverting amplifier and a clamp circuit in combination 64 and 64′ (representing each channel respectively). The clamp circuits operate to pass only those signals having a certain amplitude or greater. Such signals as are passed are applied to multiplying circuits 66 and 66′ where they are multiplied by the time spaced signals 61 or 61′, as the case may be. The output signals from the multipliers are then applied to a fourth means for summing, 68.

The output signal from the means for summing has the general appearance of signal 69. As noted on the drawing, it is of broken line form and the positive and negative components have discontinuities 70 where they come together. In some instances (e.g. where 70 is small) the signal 69 may comprise a usable form of output signal. However, it is generally desired to form a continuous signal having discontinuities 70 removed, if possible. To this end, a filter 72 is provided. The output signal from the filter 72 can be applied to recording means 113 for visual display and interpretation and is of the general form 73 having seismic events 74 clearly shown thereon and segments 75 which represent those areas where noise has been eliminated. Filter 72 can be a band pass RC active filter or a LRC passive filter of a general type well-known to those in the electronic art.

The details of a preferred embodiment of the coherence multiplication system are disclosed in copending application Serial No. 811,367, filed May 6, 1959, by J. P. Greening, now U.S. Patent No. 3,032,743, assigned to the assignee of the present application, the description of which is incorporated herein by reference.

Figure 7:
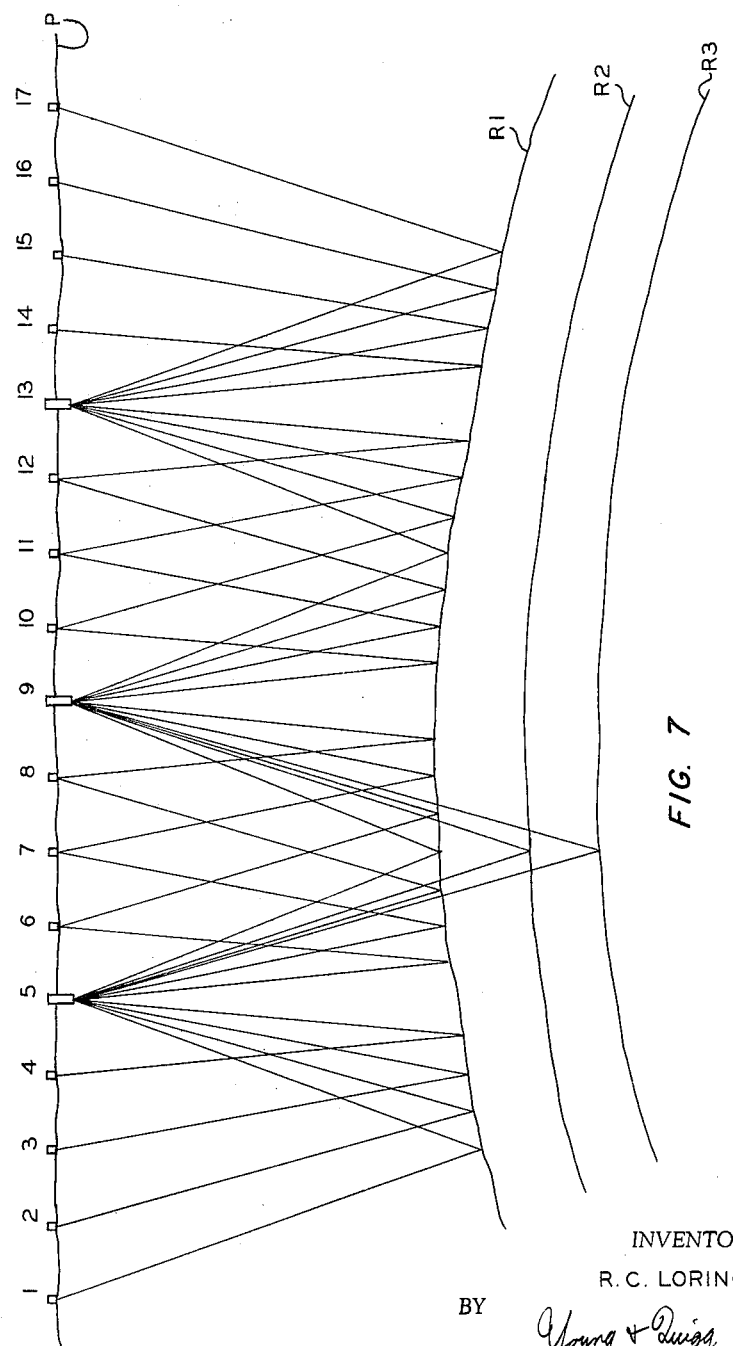
FIGURE 7 is a schematic view of terrain in cross section showing the path geometry of elastic waves as they travel from shotpoint and are reflected back to seismometers.

The basis for the reflection seismology technique is shown in the space diagram of FIGURE 7. For a purpose of brevity, let it be assumed that the datum plane P coincides with the surface of the earth. According to one procedure a first shot is fired at 5 and the sound waves generated thereby are reflected from subsurface horizons, such as R1, R2, and R3, and the reflected waves are deteced by an array of seismometers 1, 2, 3, 4, 6, 7, 8, and 9; a second shot is fired at 9 and the sound waves generated thereby are reflected from subsurface horizons R1, R2, and R3, and the reflected waves are detected by seismometers 5, 6, 7, 8, 10, 11, 12, and 13; a third shot is fired at 13 and the sound waves generated thereby are reflected from subsurface horizons R1, R2, and R3 and the reflected waves are detected by seismometers 9, 10, 11, 12, 14, 15, 16, and 17; etc.

It is often desirable to combine the records obtained from a plurality of shot points in order to achieve a display of the formation structure over a long distance. This can be accomplished by placing the records obtained from successive shot points in a side by side relationship and comparing the reflection signals from each reflector. However, when a number of reflectors exist, each recording will contain a corresponding number of reflection signals. Thus it is necessary to have some procedure for determining the reflection signals from different shot points which correspond to the same reflector. As illustrated in FIGURE 7, the firing of a shot at 5 results in detection at 9 of three different signals corresponding to the ray paths 5–R1–9, 5–R2–9, and 5–R3–9. However when a shot is fired at 9, it is possible that the sound waves generated thereby will not be reflected by one or more of the reflectors in such a manner as to be detected at 5, and this necessitates some procedure for identifying reflection signals from two different shots but corresponding to the same reflector. This can be accomplished by the "reverse path time tie," wherein the ray path from a first shot point to a first seismometer is identical to the ray path from a second shot point to a second seismometer. As shown in FIGURE 7 the ray path from 5 to R1 to 9 is identical to the ray path from 9 to R1 to 5, and the reflected signals which have traveled these paths will be recorded at the same time interval after the firing of the respective shots. The only difference is that the shot point and seismometer have been interchanged. Also the ray path 9 to R1 to 13 is identical to the ray path from 13 to R1 to 9 and the reflected signals which traverse these paths will be recorded at the same time interval after the firing of the respective shots. Thus, when the times due to traveling the same ray path in opposite directions are equal, it is common to say one has a "reverse time tie."

Figure 8A:
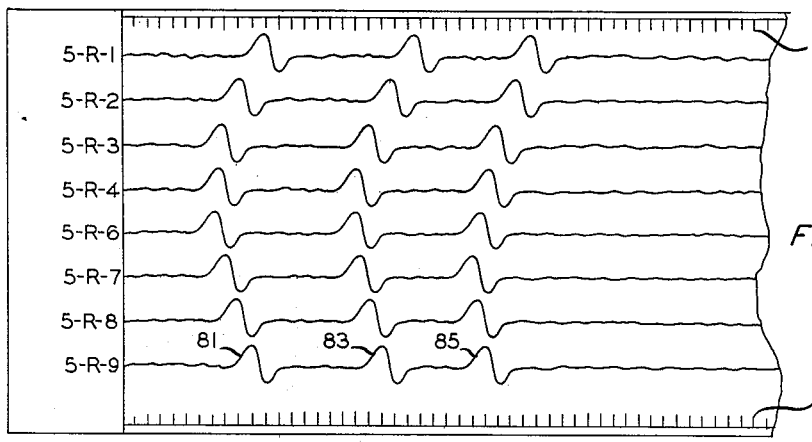
FIGURES 8A, 8B and 8C are representations of seismic recordings to be processed in accordance with the invention.
Figure 8B:
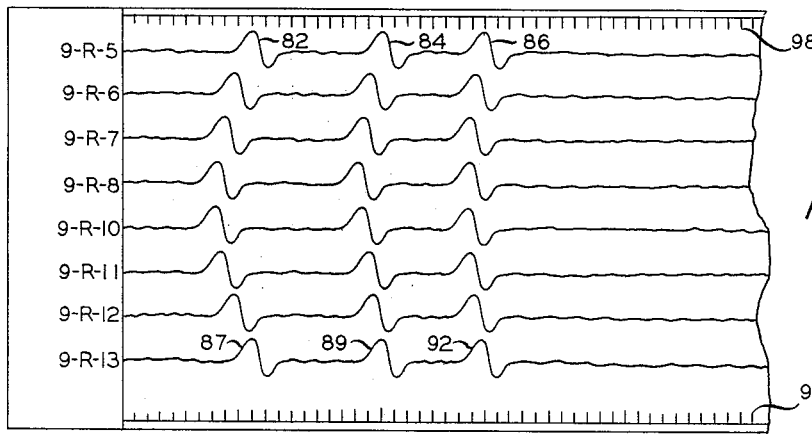
Figure 8C:
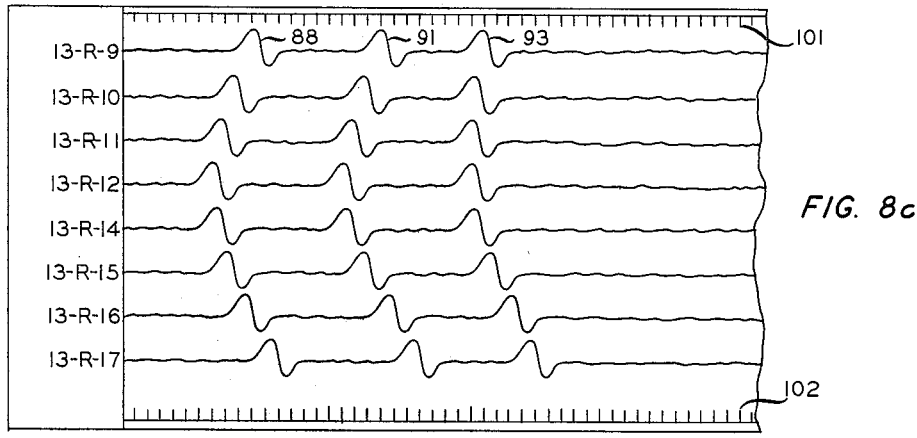

FIGURES 8a, 8b and 8c are illustrative of original recorded seismic signals corresponding to shot points 5, 9, and 13 respectively. For ease of illustration the reflected signals are shown as high signal-to-noise ratio signals, it being understood that the recorded seismic signals can be similar to that disclosed in FIGURE 2. A comparison of the traces to 5–R–9 in FIGURE 8a and 9–R–5 in FIGURE 8b illustrate the occurrence at the same time of peaks 81 and 82 of the respective traces corresponding to the reflector R1, the occurrence at the same time of peaks 83 and 84 of the respective traces corresponding to R2, the occurrence at the same time of peaks 85 and 86 of the respective traces corresponding to the reflector R3. A comparison of the traces 9–R–13 in FIGURE 8b and 13–R–9 in FIGURE 8c discloses the occurrence at the same time of peaks 87 and 88 of the respective traces corresponding to reflectors R1, the occurrence at the same time of peaks 89 and 91 of the respective traces corresponding to reflector R2, and the occurrence at the same time of peaks 92 and 93 of the respective traces corresponding to reflector R3.

Figure 9A:
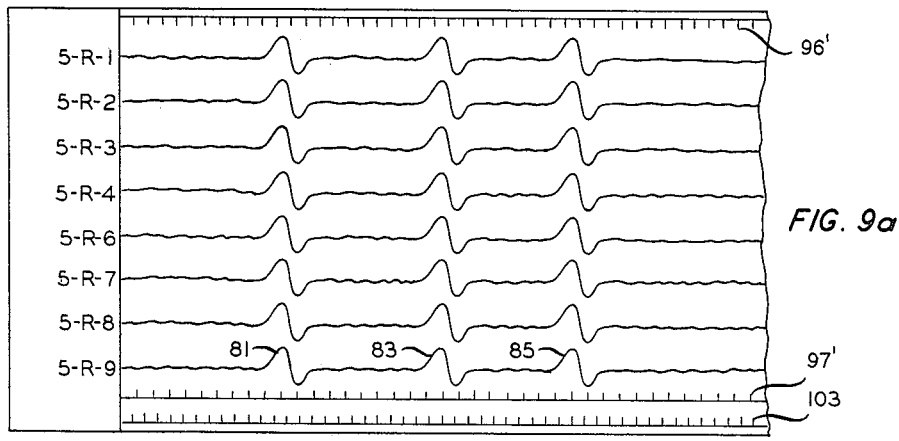
FIGURES 9A, 9B and 9C are representations of the processed signals corresponding to the recordings of FIGURES 8A, 8B and 8C, respectively.
Figure 9B:
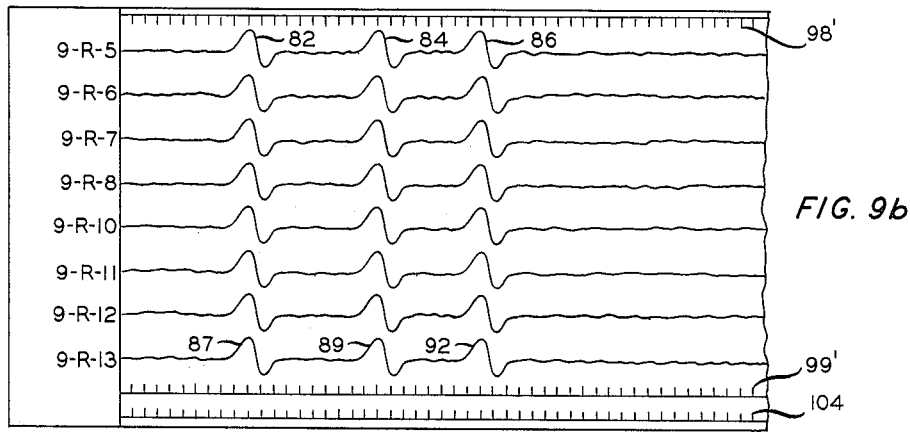
Figure 9C:
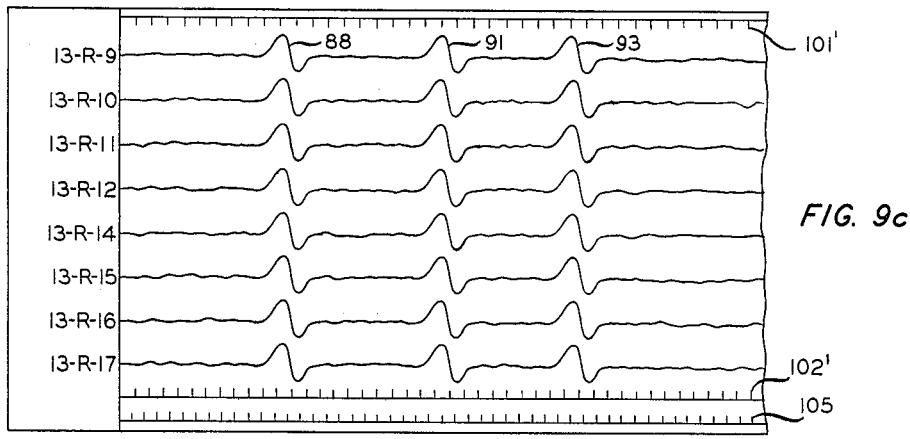

However a study of the various traces in FIGURE 8a readily discloses that the signals corresponding to R1 do not occur at the same time and this is also true for the signals corresponding to R2 and R3. This, as is well known, is due to various factors, such as the dip angle of the formation, the different lengths of travel, different velocities in different materials, varying effects of weathered layer and the like. This is also true of FIGURES 8b and 8c. As previously discussed it is often desirable that the signals be time aligned so that the signals corresponding to a particular reflector occur at the same time. As previously noted the coherence multiplication procedure requires accurate time alignment of the signals in order to achieve signals having improved signal-to-noise ratio. FIGURES 9a, 9b, and 9c are representative of the signals of FIGURES 8a, 8b, and 8c, respectively, which have been subjected to time alignment to display the relationship of the signals in normal time ($t_n$) as discussed with respect to FIGURE 4.

However, due to the differences in the time alignment applied to each of the traces, peaks 81 and 82 no longer occur in a side by side relationship. That is, peaks 81 and 82 occur at different values of normal time ($t_n$). This is also true for the peaks 83 and 84, 85 and 86, 87 and 88, 89 and 91, and 92 and 93.

In the case of original data which has a low signal-to-noise ratio it is usually extremely difficult, if not impossible, to determine the reverse path time tie between traces corresponding to different shots. When these traces have been processed in accordance with a coherence multiplication procedure, the signal peaks are visually detectable, but as shown in FIGURES 9a, 9b, and 9c the signal peaks no longer occur in the same position on the record due to the effects of the different time alignment corrections. In the case of FIGURES 9a and 9b the operator is then faced with the decision of whether peak 84 corresponds to the same reflector as peak 81 or as peak 83. The same situation applies with respect to whether peak 86 corresponds to peak 83 or peak 85; whether peak 88 corresponds to peak 87 or peak 89, etc.

In accordance with the present invention at least one time trace (time signal) is added to each set of data corresponding to a particular shot point. According to a preferred embodiment of the invention two time traces are added to the data corresponding to each shot point, each of the time traces being recorded adjacent one of the traces of the two seismometers farthest from the shot points. These time traces can be recorded at the time of the recording of the original seismic data or can be added subsequently, such as during the processing of the original data to determine the proper dip angle. Thus, as in FIGURE 4 which shows the representation of the seismometers on one side of the shot point, one of the time traces can be recorded on tape 95 corresponding to the seimometer farthest from the shot point on that side of the shot point by means of magnetic head 111 which is connected, during recording operation, to a source of time signals 112. The time signal recorded on tape 95 is thus subjected to the same dynamic processing in the system of FIGURE 4 as the seismic signal recorded on tape 95. The thus processed time signal can be stored in storage means 51 in association with its corresponding seismic signal. Thus, for the system of FIGURE 6 producing the visual record of FIGURE 9a, the processed time signal 96', which is associated with seismic signal 5–R–1, can be passed from storage means 51 through line 114 to visual recording means 113 while the processed time signal 97' which is associated with seismic signal 5–R–9 can be passed from storage means 51 through line 115 to visual recording means 113. Seismic signal 5–R–9 is applied to recording means 113 from the output of filter 72n ($n$ in this case representing the eighth individual signal channel). Normal time signal 103 can be applied to recording means 113 from source of normal time signal 116. While in the present and preferred embodiment the time trace is associated with the seismic trace corresponding to the seismometer farthest from the shot point, it is obvious that the time trace could be associated with any one of the seismic traces which corresponds to a reverse path situation. In one embodiment the time trace comprises a series of single pips occurring every 100 millisecond with a double pip every second to provide ready identification. These time traces are subjected to the same corrections, such as angularity and static corrections, in the same manner as the trace with which it is associated so that the original time interrelationship between the time trace and the corresponding signal trace is maintained substantially constant. These original time traces can be represented by traces 96 and 97 in FIGURE 8a, 98 and 99 in FIGURE 8b, 101 and 102 in FIGURE 8c, 96' and 97' in FIGURE 9a, 98' and 99' in FIGURE 9b, and 101' and 102' in FIGURE 9c. Normal time is represented in FIGURES 9a, 9b, and 9c by 103, 104, and 105, respectively. Thus, as shown in FIGURES 8a and 8b, and 9a and 9b the beginning of peaks 81 and 82 corresponds to the ninth timing pip in the original time traces, although the ninth timing pip of trace 97' in FIGURE 9a is displaced from the ninth time pip in trace 98' in FIGURE 9b. A comparison of FIGURES 9a and 9b on the basis of the original time traces readily discloses that peak 82 corresponds to peak 81, that peak 84 corresponds to peak 83, and that peak 86 corresponds to peak 85. A comparison of FIGURES 9b and 9c on the basis of the original time traces readily discloses that peaks 88, 91, and 93 correspond to peaks 87, 89, and 92, respectively.

The invention is not limited to the geometry described in the FIGURE 7, but can be applied to any type of geometry in which the "reverse path" of rays is approximately obtained. While the invention is particularly suitable for utilization in combination with a coherence multiplication procedure, it can be utilized in any procedure involving "reverse ray path" in which the "reverse ray path" data has been obliterated by manipulations of the seismic data, such as by angularity and dip corrections. The time difference between the "normal time pips" and the "original time pips" (reverse path time pips) gives the time corrections applied to the original data on the traces associated with the original time traces.

Reasonable variation and modification are possible within the scope of the foregoing disclosure, the drawings and the appended claims to the invention.

I claim:

1. Method for increasing the information available from low signal-to-noise ratio seismic signals comprising, in combination; storing each of a plurality of low signal-to-noise ratio seismic signals corresponding to a first shot point on a respective one of a plurality of magnetic tapes; also recording a time signal comprising a series of pips on a first one of said plurality of magnetic tapes in addition to one of said low signal-to-noise ratio seismic signals; passing said magnetic tapes through a transcription zone to produce a transcribed time signal and a plurality of transcribed seismic signals with each of said transcribed seismic signals being responsive to the seismic signal stored on a respective one of said magnetic tapes and to the rate of movement of such respective magnetic tape through said transcription zone, said transcribed time signal being responsive to the time signal stored on said first one of said plurality of magnetic tapes and to the rate of movement of said first one of said plurality of magnetic tapes through said transcription zone; varying the rate of movement of each of said magnetic tapes through said transcription zone as a function of time, a predetermined dip angle, and the ratio of the distance between the shot point and the seismometer station at which the respective seismic signal was detected to the average velocity of the seismic wave; summing the plurality of transcribed seismic signals from said transcription zone; comparing each of said plurality of transcribed seismic signals with the sum of said plurality of transcribed seismic signals and producing an output signal corresponding to each of said plurality of transcribed seismic signals when the respective transcribed seismic signal is in phase with said sum of said plurality of transcribed seismic signals; summing the output signals to produce a coherence signal, the magnitude of the coherence signal being representative of the common information present in said transcribed seismic signals; repeating the above procedure for a plurality of values of said predetermined dip angle; comparing the coherence signals corresponding to said plurality of values of said predetermined dip angle to determine the proper value of said dip angle for accurate time alignment of said plurality of low signal-to-noise ratio seismic signals; summing the transcribed seismic signals from said transcription zone corresponding to said proper value of said dip angle to form a first signal; generating a sawtooth signal; summing the said first signal and said sawtooth signal to form a second signal; summing said sawtooth signal and the inverse of said first signal to form a third signal; generating a pulse of uniform amplitude when said second signal exceeds a first predetermined value to form a fourth signal; generating a pulse of uniform amplitude when said third signal exceeds a second predetermined value to form a fifth signal; dividing each individual one of said transcribed seismic signals from said transcription zone corresponding to said proper value of said dip angle into positive and negative components; multiplying each of said positive components by said fourth signal to form a plurality of sixth signals; multiplying each of said negative components by said fifth signal to form a plurality of seventh signals; summing the respective sixth and seventh signals to produce a plurality of improved seismic signals having an increased signal-to-noise ratio, recording said plurality of improved seismic signals to permit visual inspection, recording the transcribed time signal corresponding to said proper value of said dip angle adjacent the individual improved seismic signal corresponding to said one of said low signal-to-noise ratio seismic signals; repeating the procedure for a plurality of low signal-to-noise ratio seismic signals corresponding to a second shot point; and comparing the transcribed time signals to obtain a reverse path time tie.

2. In a process for improving the reflection seismology technique by increasing the readability of a plurality of low signal-to-noise seismic signals corresponding to a first shot point comprising applying time alignment corrections to each of said plurality of seismic signals for a plurality of value of dip angle, summing the thus aligned signals corresponding to each of said values of dip angle to form composite signals, comparing the individual aligned signals corresponding to each of said values of dip angle with the respective composite signal and producing an output signal whenever an individual aligned signal is in phase with the respective composite signal, summing the output signals corresponding to each of said values of dip angle to form correlation signals, comparing said correlation signals to thereby determine the proper value of dip angle, summing the aligned signals corresponding to said proper value of dip angle, multiplying each of said aligned signals corresponding to said proper value of dip angle by the sum of said aligned signals when said each of said aligned signals is of the same polarity as said sum, and recording the products thereof; the improvement comprising producing a timing signal comprising a series of pulses, applying the same time alignment correction to said time signal as that applied to a predetermined one of said plurality of low signal-to-noise seismic signals, recording the thus corrected time signal; repeating the procedure for a plurality of low signal-to-noise seismic signals corresponding to a second shotpoint, and comparing thhe respective corrected time signals to obtain a reverse path time tie.

3. A method of correlating first and second seismic records, each comprising a plurality of seismic signals, to obtain a reverse path time tie, comprising correcting the plurality of seismic signals in each of said records for angularity of path differences, generating a time signal for each of said records, each said time signal comprising a series of pips, applying to each time signal the same correction for angularity of path as applied to a first one of the plurality of seismic signals of the respective one of said records to obtain first and second corrected time signals, said first one of the plurality of seismic signals of the first record representing the reverse path of said first one of the plurality of seismic signal of the second record, and comparing said first and second corrected time signal to obtain a reverse path time tie.

4. A method of correlating a first plurality of seismic signals corresponding to a first shotpoint with a second plurality of seismic signals corresponding to a second shotpoint comprising generating first and second time signals, each of said time signals comprising a series of pips, applying a time correction to each seismic signal of said first and second pluralities, applying to said first time signal the same time correction as applied to a first one of said first plurality of seismic signals to produce a first corrected time signal, applying to said second time signal the same time correction as applied to a first one of said second plurality of seismic signals to produce a second corrected time signal, said first one of said first plurality of seismic signals representing the reverse path of said first one of said second plurality of seismic signals, and recording the thus corrected first and second plurality of seismic signals and said first and second, corrected time signals to permit visual interpetation.

5. A method of maintaining the reverse path time tie between first and second sets of seismic data during subsequent processing of such data comprising generating first and second time signals, each of said time signals comprising a series of pulses, subjecting said first and second sets of seismic data to processing, subjecting said first time signal to the same processing as a first seismic signal of said first set of seismic data, subjecting said second time signal to the same processing as a first seismic signal of said second set of seismic data, said first seismic signal of said first set and said first seismic signal of said second set being representative of seismic waves which have traveled the same ray path but in opposite directions with respect to each other, and visually presenting the thus processed first and second sets of seismic data and the thus processed first and second time signals.

6. A method of obtained information from seismic data comprising generating seismic waves at a first point, detecting the reflected seismic waves at a plurality of second points to form a first set of seismic data, generating seismic waves at one of said second points and detecting the reflected waves at a plurality of points including said first point to form a second set of seismic data, generating first and second time signals, each of said time signals comprising a series of pulses, correcting said first and second sets of seismic data for angularity of path differences, applying to said first time signal the same correction for angularity of path difference applied to the seismic data of said first set corresponding to the reflected seismic waves detected at said one of said second points, applying to said second time signal the same correction of angularity of path difference applied to the seismic data of said second set corresponding to the reflected seismic waves detected at said first point, and visually presenting the thus corrected sets of seismic data and the thus corrected first and second line signals.

References Cited by the Examiner

UNITED STATES PATENTS

| | | | |
|---|---|---|---|
| 2,259,478 | 10/41 | Morgan | 181—0.5 |
| 2,732,025 | 1/56 | Lee | 181—0.5 |
| 2,902,107 | 9/59 | Erath | 181—0.5 |
| 2,998,592 | 8/61 | Wells | 340—15.5 |
| 3,032,743 | 5/62 | Greening | 340—15.5 |

SAMUEL FEINBERG, *Primary Examiner.*

CHESTER L. JUSTUS, *Examiner.*

---

UNITED STATES PATENT OFFICE
CERTIFICATE OF CORRECTION

Patent No. 3,213,411            October 19, 1965

Ralph C. Loring

It is hereby certified that error appears in the above numbered patent requiring correction and that the said Letters Patent should read as corrected below.

Column 10, line 28, for "value" read -- values --; line 51, for "thhe" read -- the --; lines 65 and 67, for "signal", each occurrence, read -- signals --; column 11, line 10, for "interpetation" read -- interpretation --; column 12, line 18, for "line" read -- time --.

Signed and sealed this 16th day of August 1966.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,213,411            October 19, 1965

Ralph C. Loring

It is hereby certified that error appears in the above numbered patent requiring correction and that the said Letters Patent should read as corrected below.

Column 10, line 28, for "value" read -- values --; line 51, for "thhe" read -- the --; lines 65 and 67, for "signal", each occurrence, read -- signals --; column 11, line 10, for "interpetation" read -- interpretation --; column 12, line 18, for "line" read -- time --.

Signed and sealed this 16th day of August 1966.

(SEAL)
Attest:

ERNEST W. SWIDER
Attesting Officer

EDWARD J. BRENNER
Commissioner of Patents